United States Patent Office 2,978,381
Patented Apr. 4, 1961

2,978,381

PROCESS AND COMPOSITION FOR LOWERING BLOOD SERUM CHOLESTEROL AND CHYLOMICRON LEVELS

Louis Freedman, 29 Lawrence Park Crescent, Bronxville, and Seymour L. Shapiro, 160 High St., Hastings on Hudson, N.Y.

No Drawing. Filed June 20, 1958, Ser. No. 743,502

4 Claims. (Cl. 167—65)

The invention pertains to a method for the treatment of and to a composition containing an oleaginous material.

An object of the invention is to provide a method in accordance with which safflower oil is substantially freed from oxidation products, such as peroxides, and maintained in such condition.

A particular object of the invention is the provision, as a composition of matter, of safflower oil substantially free from oxidation products.

A specific object of the invention is the provision of a composition of matter containing purified safflower oil and tocopherol. It will be understood that the term "tocopherol," as used hereinafter in the specification and in the claims, includes vitamin E in its various forms. The preferred oil is safflower oil, which has a high content of glycerides containing the essential unsaturated fatty acids, with approximately 70 to 80 percent being linoleic acid.

Other objects of the invention will in part be obvious and will in part appear hereinafter.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

In the practice of the invention, the oil having the glycerides containing essential unsaturated fatty acids, viz., linoleic, linolenic and arachidonic acids, may be purified, i.e., oxidation products removed therefrom, by treatment thereof with activated bentonite. The bentonite is activated by a treatment with acid suitably followed by drying and heating. More particularly, the bentonite is boiled in an inorganic acid selected from the group consisting of hydrochloric and sulfuric acids having normalities of 5 N and 4 N, respectively, then freeing the bentonite from acid, followed by drying, and as a final step it may be fired. The boiling of the bentonite in the acid solution may be for a period of about 3 hours, with drying being effected at a temperature of about 110° C., and firing, when employed, at a temperature of about 400° C. for about 30 minutes.

Further, the treatment of the oleaginous material may be for a period of at least 30 minutes, and suitably for a period from about 30 minutes to about 3 hours and at a temperature from about 20° C. to about 60° C., with the amount of activated bentonite being from about 3% to about 10%, preferably using a weight ratio of bentonite to oil of 1:10.

The procedure, accordingly, results in an oil having glycerides containing substantial quantities of the essential unsaturated fatty acids, which has been freed from oxidation products, e.g., peroxides. Further, the oil may be stabilized by having a content of an oxidation inhibitor, such as "Tenox II", which has the following composition:

| | Percent |
|---|---|
| Butylated hydroxy anisole | 20 |
| Propyl gallate | 6 |
| Citric acid | 4 |
| Propylene glycol | 70 |

Additional oxidation inhibitors are nor-dihydroguaretic acid, and tertiary butylphenol.

More particularly, the composition consists of safflower oil which is substantially free from oxidation products and from unpleasant odor. Additionally, the safflower oil suitably has a content of an oxidation inhibitor and also of tocopherol.

As an illustrative embodiment of a manner in which the invention may be practiced, the following examples are presented.

EXAMPLE I

*Purification of safflower oil*

We have found that a bentonite, suitably that marketed by American Colloid Corp. under the designation "Volclay 49–SPV," 200 mesh, when activated by our process, is an effective, economical and rapid adsorbent of peroxides in vegetable oils upon direct treatment.

The bentonite is activated by boiling for three hours with 5 N hydrochloric acid or 4 N sulfuric acid. The activated bentonite is filtered and washed free of acid by thorough rinsing with distilled water. It is then dried at about 110° C., and may then be fired by heating at about 400° C. for about 30 minutes.

The oil may preferably additionally be treated with an activated carbon, e.g., "Darco G60," which removes unpleasant odor of the oil. This may be effected by the use of about 0.25% to about 0.5% "Darco G60" in well-stirred suspension for about three hours. The oil is then filtered in preparation for the activated bentonite treatment, and is again filtered after the bentonite treatment.

The "Darco G60" is illustrative of activated carbons having absorbent, particularly deodorizing, properties. It is an activated, finely divided carbon of vegetable origin manufactured by the Atlas Powder Company.

Table I, illustratively, details observations made, and experimental variables, in the treatment of safflower oil.

TABLE I

| No. | Activated Carbon | Percent Bentonite, How Activated | Bentonite Suspension in Oil Treatment | Peroxides (calcd. as mg. $H_2O_2$ per gram of oil) |
|---|---|---|---|---|
| 1 (original oil) | | | | 0.90. |
| 2 | | 3%—HCl fired | 30 min.; 60° C | 0.093. |
| 3 | | 10%—HCl fired | 30 min.; 60° C | none detected. |
| 4 (original oil filtered through paper) | | | | 0.81. |
| 5 | 0.25% "Darco G60" a | 10%—HCl fired | 30 min.; 60° C | none detected. |
| 6 | | 5%—HCl fired | 30 min.; 60° C | none detected. |
| 7 | 0.5% "Darco G60" | | | 0.88. |
| 8 | | 10%—$H_2SO_4$ unfired | 30 min.; 60° C | none detected. |
| 9 | | 10%—$H_2SO_4$ unfired | 3 hrs.; 20° C | none detected. |
| 10 | | 10%—$H_2SO_4$ fired | 3 hrs.; 20° C | none detected. |
| 11 | | 10%—HCl unfired | 3 hrs.; 20° C | none detected. |
| 12 | | 10%—$H_2SO_4$ unfired | 2 hrs.; 20° C | none detected. |
| 13 | | 10% | 2 hrs.; 20° C | 0.74. |
| 14 | 0.5% "Darco G60" | 10%—HCl unfired | 2 hrs.; 20° C | none detected. |
| 15 | 0.5% "Darco G60" | 10%—HCl unfired | 30 min.; 60° C | none detected. | a Bentonite used first, then Darco.

The foregoing shows the distinctive effect of the activated bentonite for removal of peroxides.

Further, Table I indicates the experimental variables attending our procedure and yielding a satisfactory product. The preferred procedure utilizes a 10% suspension of bentonite, which has been activated and not fired.

EXAMPLE II

Stabilization of the purified oil

The oil as processed in Example I is treated with 0.1% of "Tenox II," and after a period of six months at 37° C., the peroxide content was unchanged.

Other suitable non-toxic commercial oxidation inhibitors may be used, such as nor-dihydroguaretic acid.

EXAMPLE III

Tocopherol—purified oil

A mixture of 9 parts of the stabilized oil of Example II, and 1 part of $dl$-α-tocopherol acetate is prepared. There is ready miscibility. The homogeneous solution is stable. This was demonstrated by the fact that when placed on stability test for a period of 8 months at 40° C., the peroxide content was unchanged.

In place of the $dl$-α-tocopherol acetate, other forms of vitamin E may be used in equivalent amounts, and the compositions may contain various proportions of stabilized oil and of tocopherol. Thus the tocopherol may be present in an amount from about 0.03 to about 1 part.

The stable purified oil which has glycerides reflecting 70–80% of unsaturated fatty acids (as linoleic acid) may be encapsulated in 500 mg. quantities for therapeutic utility. The tocopherol-purified oil composition may be encapsulated also, and is a preferred product.

Furthermore, various formulations may be prepared which contain a lipotropic factor, and the following is illustrative of such compositions that contain purified and stabilized unsaturated fatty acids containing glycerides as the essential constituent.

| | | |
|---|---|---|
| Vitamin $B_{12}$, USP | mcg | 1 |
| Liver desiccated NF | mg | 87 |
| $dl$ Methionine | mg | 110 |
| Inositol | mg | 83 |
| Choline bitartrate | mg | 233 |
| Safflower oil [1] | mg | 337 |

Excipients and fillers q.s. to give a weight of approximately 959 mg., and a volume of approximately 14 minims.

[1] The safflower oil was that which had been purified and stabilized in accordance with our invention, and contained 10% $dl$-α-tocopherol acetate.

It will be realized that the constituents in the above composition are not limited in amounts to those given therein, but that the amounts may be varied, i.e., greater or lesser, within the scope of the invention.

Another formulation embodying lipotropic factors along with the essential unsaturated fatty acids as obtained from safflower oil is the following:

| | | |
|---|---|---|
| Vitamin $B_{12}$ USP | mcg | 1 |
| Liver desiccated NF | mg | 87 |
| $dl$ Methionine | mg | 110 |
| Inositol | mg | 40 |
| Choline bitartrate | mg | 233 |
| Purified and stabilized safflower oil | mg | 415 |
| $dl$-α-tocopherol acetate | mg | 4 |
| Pyridoxine HCl | mg | 2.1 |

Excipients and fillers q.s. to give a weight of approximately 954 mg.

Clinical use of this product has led to a gratifying decrease in serum cholesterol levels and consistent and significant shift from β or α lipoprotein and reduction of chylomicron levels of treated atherosclerotic patients.

We have ascertained that a certain minimum level of vegetable fat having a high concentration of essential unsaturated fatty acids is necessary to prevent hypercholesteremic response when cholesterol and fat are fed, and that diets low in fat, but comprising saturated fats, do not protect against the hypercholesteremic response.

Further, if controlled diets are administered in which the fat contains large amounts of essential unsaturated fatty acids (EUFA), beyond a certain fat level a breakpoint in the protective action of the EUFA against the rise in cholesterol levels occurs. This added fat, over and beyond the minimal protective level assumes the undesired role along with cholesterol of contributing to a dangerously elevated cholesterol content.

The invention provides a means of supplying the required amount of EUFA in form for administration to afford the necessary 4–6 grams of the EUFA per day per patient. This spares the need for elaborately evaluated diets, and control measures can be easily instituted.

This application is a continuation-in-part of our co-pending application Serial No. 576,769, filed April 9, 1956, now abandoned.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A composition of matter consisting essentially of

| | Parts by weight |
|---|---|
| Vitamin $B_{12}$ | 1 |
| Liver, desiccated | 87 |
| dl-Methionine | 110 |
| Inositol | 40 |
| Choline bitartrate | 233 |
| Safflower oil | 415 |
| dl-d-Tocopherol acetate | 4 |
| Pyridoxine HCl | 2.1 |
| Excipients and fillers q.s. | |

2. A composition of matter consisting essentially of

| | Parts by weight |
|---|---|
| Vitamin $B_{12}$ | 1 |
| Liver desiccated | 87 |
| dl Methionine | 110 |
| Inositol | 40 |
| Choline bitartrate | 233 |
| Safflower oil | 337 |
| Excipients and fillers q.s. | |

3. A process for lowering cholesterol and chylomicron levels which comprises administering a therapeutic amount of a composition in accordance with claim 1.

4. A process for lowering cholesterol and chylomicron levels which comprises administering a therapeutic amount of a composition as defined in claim 2.

References Cited in the file of this patent

UNITED STATES PATENTS

| 2,428,082 | King | Sept. 30, 1947 |
| 2,569,124 | Christenson | Sept. 25, 1951 |

OTHER REFERENCES

Tuttle: Geriatrics, 1:7, 1952, pp. 37–41.

Modern Drug Ency., Drug Pub. Inc., N.Y., 5th ed., 1952, pp. 418, 528, 532, 608, 1201.

Jamison: Vegetable Fats and Oils, 2nd ed., 1943, pp. 297–299.

Lange: J. Amer. Oil Chem. Soc., vol. 27, February 1950, pp. 414–422.

Minnesota Medicine, December 1955, pp. 864–870.